United States Patent [19]

White

[11] Patent Number: 4,635,495

[45] Date of Patent: Jan. 13, 1987

[54] MULTI-SPEED REVERSIBLE POWER TRANSMISSION

[75] Inventor: Basil White, Roscoe, Ill.

[73] Assignee: Twin Disc, Incorporated, Racine, Wis.

[21] Appl. No.: 788,921

[22] Filed: Oct. 18, 1985

[51] Int. Cl.⁴ ............................................. F16H 3/08
[52] U.S. Cl. ......................................... 74/364; 74/360; 74/362; 74/363; 74/730
[58] Field of Search ................... 74/360, 362, 363, 364, 74/730

[56] References Cited

U.S. PATENT DOCUMENTS

| | | | |
|---|---|---|---|
| 2,953,942 | 9/1960 | Schwartz et al. | 74/364 X |
| 3,243,026 | 3/1966 | Snoy et al. | 192/87.17 |
| 3,425,293 | 2/1969 | Krawczyk et al. | 74/364 X |
| 3,470,988 | 10/1968 | Sieverkropp | 192/87.15 |
| 3,540,556 | 11/1970 | Snoy et al. | 192/4 |
| 3,916,710 | 11/1975 | Sisson et al. | 74/360 X |
| 4,090,414 | 5/1978 | White | 74/733 |
| 4,136,575 | 1/1979 | Labat | 74/360 |
| 4,549,443 | 10/1985 | White | 74/360 X |

FOREIGN PATENT DOCUMENTS 3030850 6/1981 Fed. Rep. of Germany ........ 74/364
1259618 3/1961 France ................................. 74/364

Primary Examiner—Kenneth J. Dorner
Assistant Examiner—Dwight G. Diehl
Attorney, Agent, or Firm—James E. Nilles

[57] ABSTRACT

A multi-speed power transmission utilizing ten gears, seven clutches and four shafts provides eight forward speeds and four reverse speeds. The transmission is coaxial in that the input and the output shafts are on the same centerline. The transmission requires only a minimum number of gears, clutches and shafts for the large number of gear ratios provided, and at the same time it is relatively compact and has only three shaft centers. In this transmission there are always three clutches applied in any speed range. Of the seven shifts between forward speed ranges, four of them require the engagement of one different clutch only, two of them require two different clutches to engage simultaneously, and one shift requires engaging three different clutches. The clutches are of the type having multiple friction plates, and hydraulically applied force pistons which are spring load returned. The clutches include appropriate ball dump valves in the force pistons.

4 Claims, 2 Drawing Figures

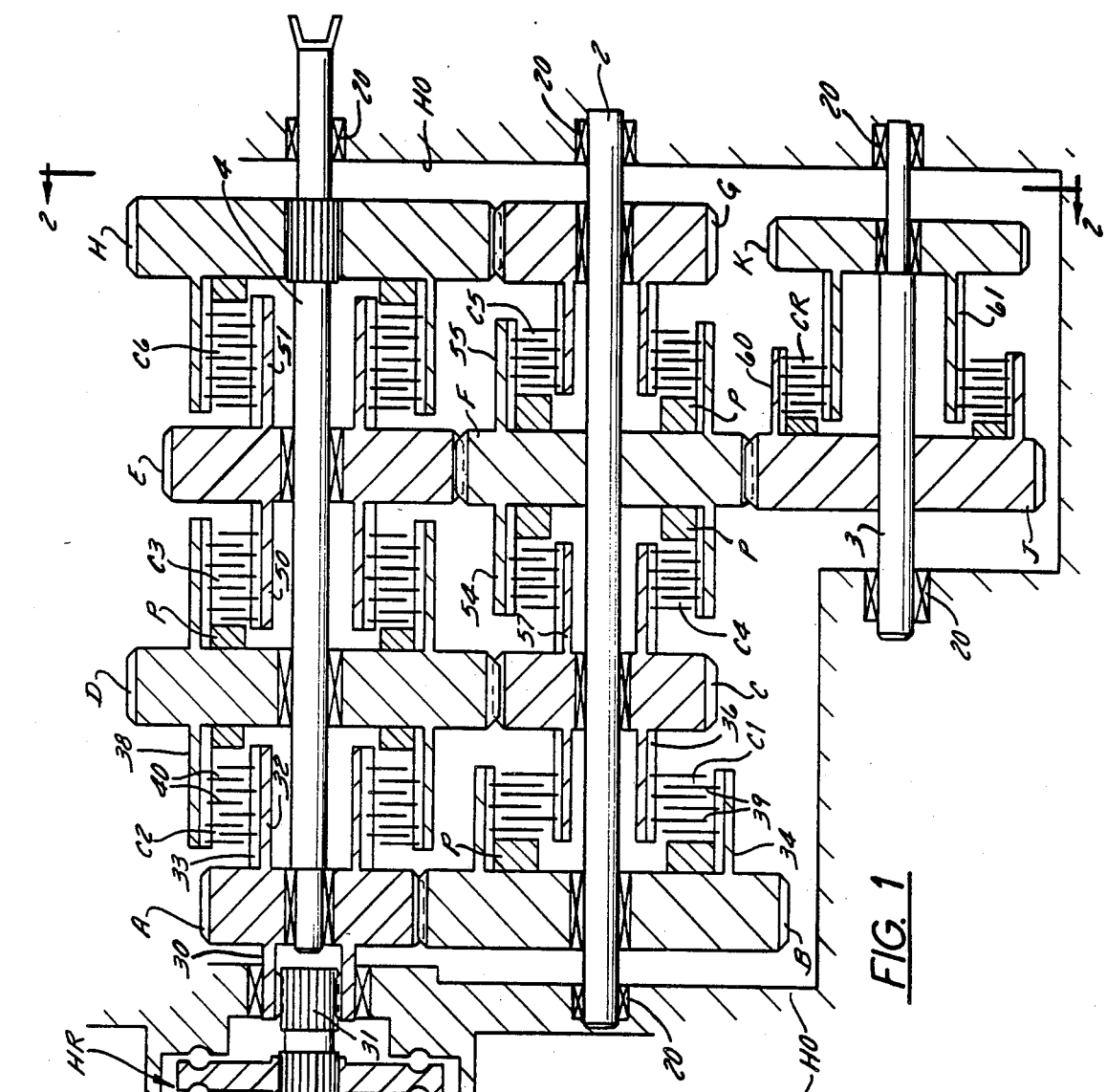
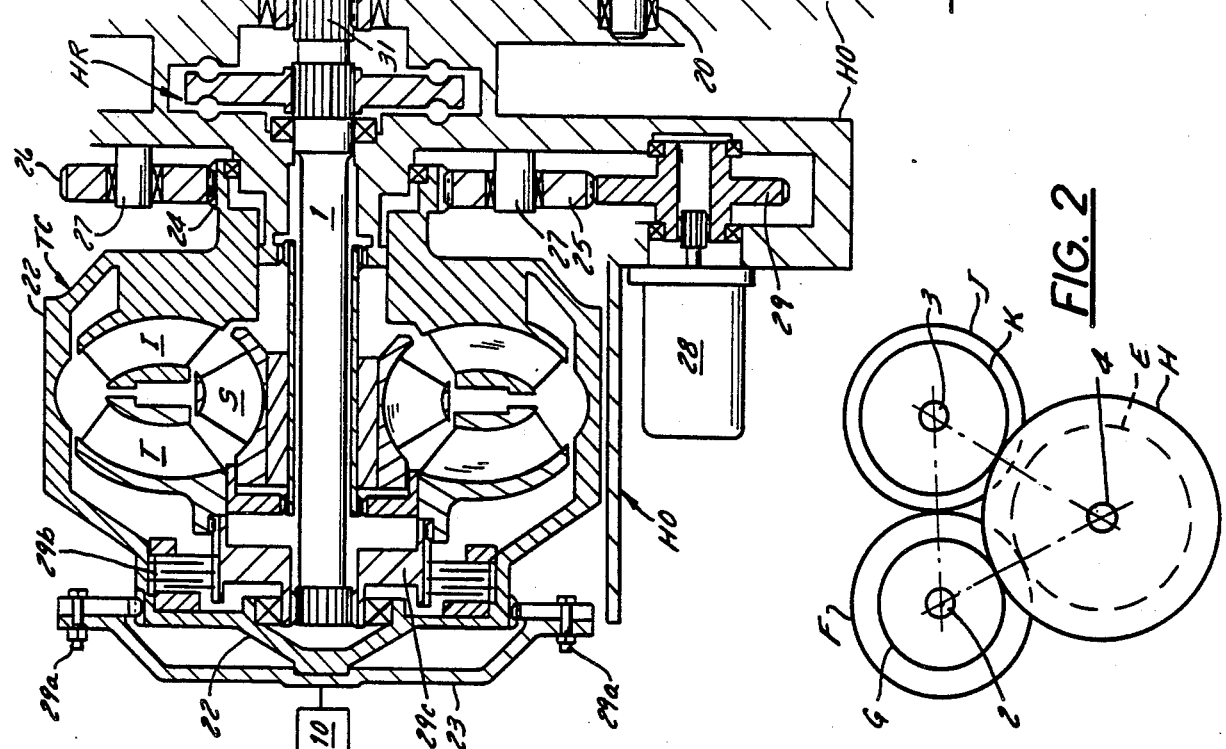

MULTI-SPEED REVERSIBLE POWER TRANSMISSION

BACKGROUND OF THE INVENTION

In prior art transmissions of the type to which the present invention pertains, friction plate, hydraulically actuated clutches are utilized to cause engagement of the gears. Various examples of this general type of clutch and transmissions of this general character are found in the following patents which have been assigned to an assignee common with the present application: U.S. Pat. No. 3,425,293, issued Feb. 4, 1969, to Krawczyk et al, U.S. Pat. No. 3,243,026 of Mar. 29, 1966 to Snoy et al, U.S. Pat. No. 3,540,556 of Nov. 17, 1970 to Snoy, U.S. Pat. No. 3,470,988 of Oct. 7, 1969 to Sieverkropp, and my U.S. Pat. No. 4,090,414 of May 28, 1978. The transmissions shown in those patents required a large number of components, particularly gears to perform the functions provided by the present invention. Another example of the prior art is shown in my copending application Ser. No. 558,810, filed Dec. 7, 1983, and which will issue on Oct. 29, 1985 as U.S. Pat. No. 4,549,443.

SUMMARY OF THE INVENTION

The present invention provides a power transmission having a minimum number of gears, clutches and shafts for the number of gear ratios provided, while at the same time the transmission is relatively compact and has but three shaft centers. More specifically, the present invention provides a transmission of this type wherein there is provided a total of ten gears, utilizing seven clutches and four shafts, and which results in eight forward speeds and four reverse speeds.

In the transmission provided by the present invention, there are always three clutches engaged during any speed range. Of the seven shifts between forward speed ranges, four of the shifts require the engagement of one different clutch only, two of them require two different clutches to engage simultaneously, and one of the shifts requires engaging three different clutches. The clutches used in the present transmission are of the multi-plate, friction type, which are hydraulically actuated by hydraulic pistons, the pistons being spring load returned and contain ball dump valves. Generally, the present invention provides a particularly compact and efficient arrangement of gears, clutches and shafts, particularly considering the number of forward and reverse speeds that are provided.

DESCRIPTION OF THE DRAWINGS

FIG. 1 is a longitudinal cross-sectional view through the transmission of the present invention and showing the shafts in "exploded" or "spread-out" arrangement; and FIG. 2 is a transverse cross-sectional view through the transmission of the present invention and taken generally along the line 2—2 in FIG. 1.

DESCRIPTION OF A PREFERRED EMBODIMENT

FIG. 1 is a generally schematic cross-sectional view of the present invention and shows the general arrangement including a housing HO in which the various shafts are supported by anti-friction bearing assemblies 20 of conventional character.

The transmission generally includes a power input shaft 1 which is driven by a torque converter TC whose rotatable housing 22 is driven from the engine flywheel 23 from the power source as an engine 10. The torque converter rotating housing 22 includes gear teeth 24 at its rear end which, in turn, drives the idler gears 25 and 26 that are mounted on stub shafts 27 secured in the housing HO. A hydraulic pressure pump 28 is mounted in the housing HO and is driven through its gear 29 that meshes with the gear 25. The pump 28 furnishes the necessary pressure fluid to actuate the hydraulically actuated clutches to be referred to. The torque converter includes the conventional bladed sections such as the impeller I that rotates and is integral with the housing 22, the stationary stator S, and turbine T which is drivingly connected at the spline connections of collar $29c$ to the input shaft 1 for driving the latter at its forward splined end.

The engine flywheel 23 is secured to the torque converter housing 22 by bolt means $29a$.

A hydraulically actuated friction plate clutch $29b$ disengagingly connects the rotatably driven torque converter housing 22 to shaft 1 by the splined collar $29c$. When clutch $29b$ is engaged the power is transmitted from the engine flywheel, and directly through the rotatable torque converter housing 22 through collar $29c$ and to the shaft 1. If clutch $29b$ is disengaged, the drive is through the torque converter blading, collar $29c$ and to shaft 1.

In addition to the input shaft 1, an output shaft 4 is also provided, and countershaft 2 and reverse shaft 3 are arranged in parallelism with input shaft 1 and output shaft 4. All the shafts suitably journalled in the housing in the conventional and well-known manner, in bearing assemblies 20. It will be noted that the input shaft 1 and the output shaft 4 are in coaxial alignment with one another.

A hydraulic retarder HR is interposed between the input shaft 1 and the housing HO and can act as a brake for the vehicle or other load to be driven by the transmission. Retarders of this general type are shown in the U.S. Pat. No. 4,262,781 issued to Schneider on Apr. 21, 1981, U.S. Pat. No. 4,324,387 issued Apr. 13, 1982 to Steinhagen, or U.S. Pat. No. 4,326,433 issued Apr. 27, 1982 to Black et al.

An input driver gear A has a collar 30 that is interiorly splined and which is in constant mesh with the spline portion 31 of the end of shaft 1. The gear A is journalled on the end of shaft 4 and has a drum portion 32 containing exterior splines 33. In this manner the shaft 4 is connected to the input shaft 1, that is to say the input shaft 1 is in driving relationship with gear A which, in turn, is rotatably mounted on the shaft 4.

Gear B (a fifth gear) is journalled on shaft 2 and is in constant mesh with gear A. Gear B also has an internally splined drum portion 34. Gear C (a sixth gear) is rotatably journalled on the countershaft 2 and is in constant mesh with gear D (a third gear) which, in turn, is journalled on output shaft 4. Gear C has an externally splined drum portion 36 while gear D has an internally splined drum portion 38. A multiplicity of interleaved friction plates 39 are interposed between the drum portion 34 and drum portion 36 of gears B and C, respectively, the forming of a first clutch C1. These plates are interleaved and alternately splined to the drums in the well-known manner. The clutch plates 40 between drum portions 32 and 38 of gears A and D, respectively, are similarly arranged and form a second clutch C2.

Thus, the plates can transmit power between their adjacent gears when the plates are clamped together by the hydraulically actuated pistons which bear against them, in the known manner. Specifically, when the clutch C2 formed between gears A and D is pressurized or clamped up, this engagement causes gear A to be drivingly connected to gear D. Similarly, when clutch C1 is engaged, gear B drives gear C. Gears E (a fourth gear) and F (a seventh gear) mounted respectively, on output shaft 4 and countershaft 2 have similar clutches C3 (a third clutch) and C6 (a sixth clutch) on opposite sides of gear E while gear F has clutches C4 (a fourth clutch) and C5 (a fifth clutch) arranged on its opposite sides. More specifically, gear E has externally splined drums 50 and 51 connected to it which, through the clutch plates shown, form a driving connection with gears D and H when the respective clutches C3 and C6 are hydraulically engaged. Similarly, gear F has internally splined drums 54 and 55 which, through the interleaved friction plates shown, can drivingly connect with gears C and G (an eighth gear), respectively, through the splined drums 57 and 58, respectively, of those gears.

The reverse shaft 3 has a gear J (a ninth gear) fixed to it and a gear K (a tenth gear) is rotatably mounted on the shaft 3. A seventh clutch, reverse clutch CR, is provided between gears J and K by means of the clutch plates interleaved between the internally splined drum 60 of gear J and the externally splined drum 61 of gear K.

It will be noted that gear F is press-fit on shaft 2 for driving engagement therewith while the other gears A, B, C, D, E and G are rotatably mounted on their respective shafts. The output driven gear H, however, has a spline connection with its output shaft 4.

It should be noted that the various clutches have actuating pistons P which, when hydraulically actuated, act to compress the clutch plates against a stop member (not shown) thereby causing clutch engagement. The clutch is released when the hydraulic pressure is taken off the piston P and springs (not shown) cause positive disengagement of the plates by returning the pistons to the retracted position, all in the well-known manner. If a more complete description of the clutches and their operation is deemed to be either necessary or desirable, reference may be had to the aforementioned patents.

The following table illustrates the various gear ranges available, the clutches to be engaged for any particular gear range selected, and the path of the power flow from the input shaft 1 to the output shaft 4 for each of the gear ranges selected.

| Gear Range | Clutches Engaged | Power Flow (From #1 to A to B, Etc. to 190 4) |
|---|---|---|
| FORWARD | | |
| 1st | C1, C3, C5 | #1-A-B-C1-C-D-C3-E-F-C5-G-H-#4 |
| 2nd | C1, C4, C5 | #1-A-B-C1-C4-C5-G-H-#4 |
| 3rd | C2, C3, C5 | #1-C2-C3-E-F-C5-G-H-#4 |
| 4th | C2, C4, C5 | #1-C2-D-C-C4-C5-G-H-#4 |
| 5th | C1, C3, C6 | #1-A-B-C1-C-D-C3-C6-#4 |
| 6th | C1, C4, C6 | #1-A-B-C1-C4-F-E-C6-#4 |
| 7th | C2, C3, C6 | #1-C2-C3-C6-#4 |
| 8th | C2, C4, C6 | #1-C2-D-C-C4-F-E-C6-#4 |
| REVERSE | | |
| 1st | C1, C3, CR | #1-A-B-C1-C-D-C3-E-F-J-CR-K-H-#4 |
| 2nd | C1, C4, CR | #1-A-B-C1-C4-F-J-CR-K-H-#4 |
| 3rd | C2, C3, CR | #1-C2-C3-E-F-J-CR-K-H-#4 |
| 4th | C2, C4, CR | #1-C2-D-C-C4-F-J-CR-K-H-#4 |

As mentioned, gear F is semi-permanently attached to shaft 2 by means of an interference fit. No torque is transmitted through the joint. In the power flow path shown above, the gears are included in the power flow path only when power is transmitted through the gear teeth and not when power is through the gear body from clutch to clutch. Note that gear C drives gear D in a reduction manner in some gear ranges and that it is driven by gear D in an over-drive or speed increasing manner in other ranges. Gears E and F are both driver and driven gears, depending on the speed range selected.

In the present invention, it is possible to provide eight forward and four reverse speeds with a total of ten gears, seven clutches and four shafts. This transmission uses a minimum number of gears, clutches and shafts for the number of gear ratios obtained. At the same time it is relatively compact and has but three shaft centers.

What is claimed as the invention is:

1. A multi-speed reversible transmission for providing eight forward speeds and four reverse speeds and comprising, a housing, four shafts mounted in said housing and arranged in parallelism, said shafts including an input shaft and an output shaft which together are in coaxial alignment with one another, a countershaft and a reverse shaft;

said transmission including ten gears and seven hydraulically actuated multiple friction disc type clutches;

said gears including an input driver gear journalled on one end of said output shaft and having a driving connection with said input shaft, an output driven gear fixed at the other end of said output shaft for rotation therewith, and a 3rd and 4th gear journalled on said output shaft and located axially between said input driver gear and said output driven gear; said gears also including a 5th, 6th, 7th and 8th gear mounted on said countershaft, said 5th, 6th and 8th gear journalled for rotation on said countershaft, and said 7th gear fixed to said countershaft for rotation therewith, said 7th gear located axially between said 6th and 8th gears, said 5th gear being in constant mesh with said input driver gear, said 6th gear being in constant mesh with said 3rd gear, said 7th gear being in constant mesh with said 4th gear, and said 8th gear being in constant mesh with said output driven gear; said gears furthermore including a 9th gear fixed to said reverse shaft and a 10th gear rotatably journalled on said reverse shaft;

said clutches including a 1st clutch located between said 5th gear and said 6th gear so as to form a disengagable driving connection therebetween, a 2nd clutch located between said input driver gear and said 3rd gear, a 3rd clutch located between said 3rd gear and said 4th gear, a 4th clutch located between said 6th gear and said 7th gear, a 5th clutch located between said 7th gear and said 8th gear, a 6th clutch located between said 4th gear and said output driven gear, and a 7th clutch located between said 9th gear and said 10th gear so as to form a disengagable driving connection therebetween for reversing the transmission output, each of said clutches acting to form a driving connection between its respective gears when said clutch is engaged, whereby said clutches can be hydraulically actuated to cause their respective gears to be drivingly connected with another and thereby provide various gear speeds for said transmission.

2. The transmission set forth in claim 1 including a torque converter having a rotatable housing and also having bladed sections in its toroidal path for transmitting power through said torque converter, an engine and flywheel connected to said rotatable housing of said torque converter for driving the latter, said input shaft being mounted concentrically within said torque converter, said torque converter blading including a turbine section drivingly connected with said input shaft and for driving the latter when said power flow is through said torque converter, a disengageable friction type clutch between said turbine section and said torque converter housing, said clutch, when engaged, acting to conduct power from said torque converter housing directly to said input shaft and bypassing said torque converter blading, and when said clutch is disengaged, power flows from said torque converter housing through said blading and to said input shaft.

3. The transmission set forth in claim 2 including a hydraulic retarder interposed between said input shaft and said transmission housing whereby said retarder can act as a brake for the output of said transmission.

4. A multi-speed reversible transmission for providing eight forward speeds and four reverse speeds and comprising, a housing, four shafts mounted in said housing and arranged in parallelism, said shafts including an input shaft and an output shaft which together are in coaxial alignment with one another, a countershaft and a reverse shaft;

said transmission including ten gears and seven clutches;

said gears including an input driver gear journalled on one end of said output shaft, an output driven gear fixed at the other end of said output shaft for rotation therewith, and a 3rd and 4th gear journalled on said output shaft and located axially between said input driver gear and said output driven gear; said gears also including a 5th, 6th, 7th and 8th gear mounted on said countershaft, said 5th, 6th and 8th gear journalled for rotation on said countershaft, and said 7th gear fixed to said countershaft for rotation therewith, said 7th gear located axially between said 6th and 8th gears, said 5th gear being in constant mesh with said input driver gear, said 6th gear being in constant mesh with said 3rd gear, said 7th gear being in constant mesh with said 4th gear, and said 8th gear being in constant mesh with said output driven gear; said gears furthermore including a 9th gear fixed to said reverse shaft and a 10th gear rotatably journalled on said reverse shaft;

said clutches including a 1st clutch located between said 5th gear and said 6th gear, a 2nd clutch located between said input driver gear and said 3rd gear, a 3rd clutch located between said 3rd gear and said 4th gear, a 4th clutch located between said 6th gear and said 7th gear, a 5th clutch located between said 7th gear and said 8th gear, a 6th clutch located between said 4th gear and said output driven gear, and a 7th clutch located between said 9th gear and said 10th gear, each of said clutches acting to form a disengageable driving connection between its respective gears.

* * * * *